June 9, 1942.  R. W. JOHNSON ET AL  2,286,137
FURNACE CONTROL
Filed July 10, 1939  5 Sheets-Sheet 2

INVENTORS
Ray W. Johnson and
Charles V. McCarty
BY John W. Michael
ATTORNEY.

June 9, 1942. R. W. JOHNSON ET AL 2,286,137
FURNACE CONTROL
Filed July 10, 1939   5 Sheets-Sheet 3
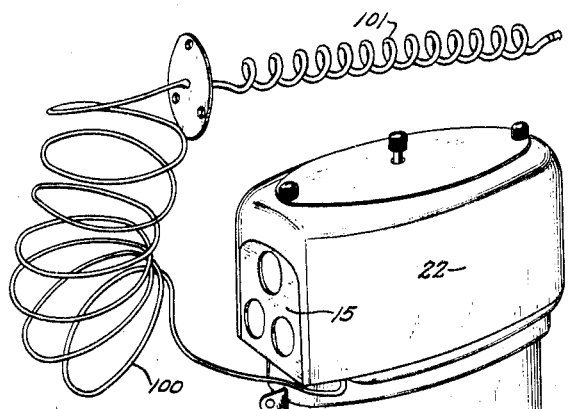
Fig. 7.
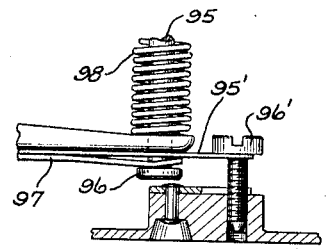
Fig. 6.
Fig. 12.
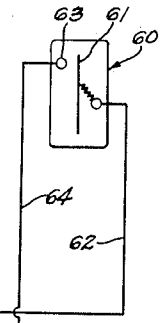
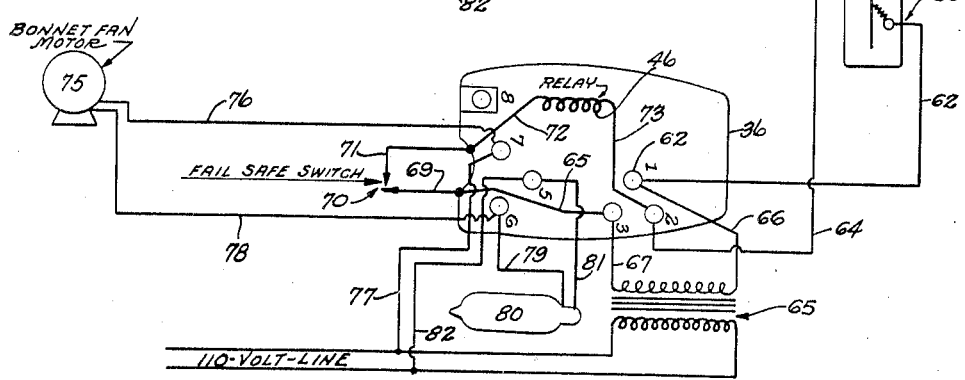
Fig. 13.
INVENTORS
Roy W. Johnson and
Lourdes V. McCarty
BY John W. Michael
ATTORNEY.

June 9, 1942.  R. W. JOHNSON ET AL  2,286,137
FURNACE CONTROL
Filed July 10, 1939  5 Sheets-Sheet 4
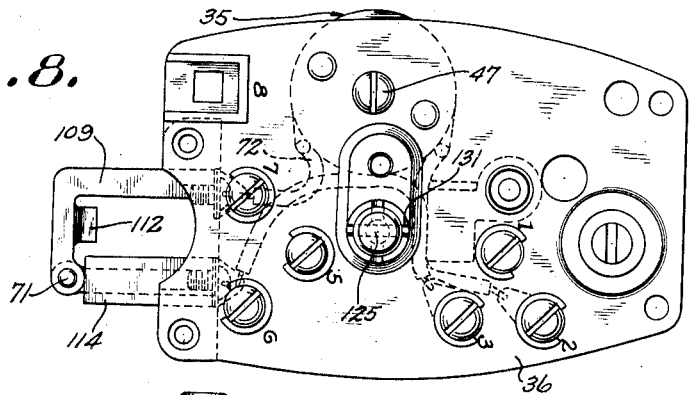
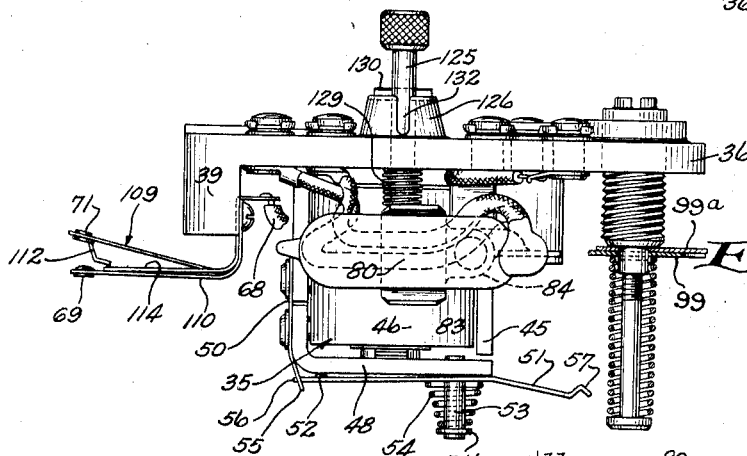
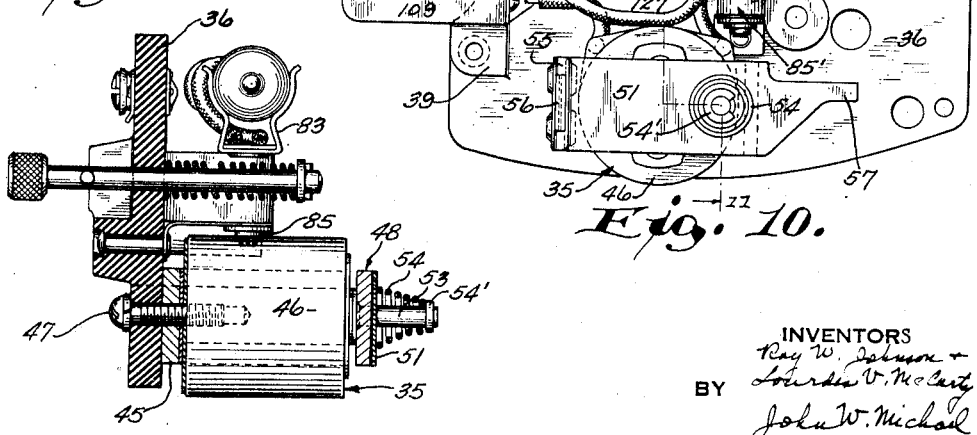
INVENTORS
Ray W. Johnson +
Lourdes V. McCarty
BY
John W. Michael
ATTORNEY

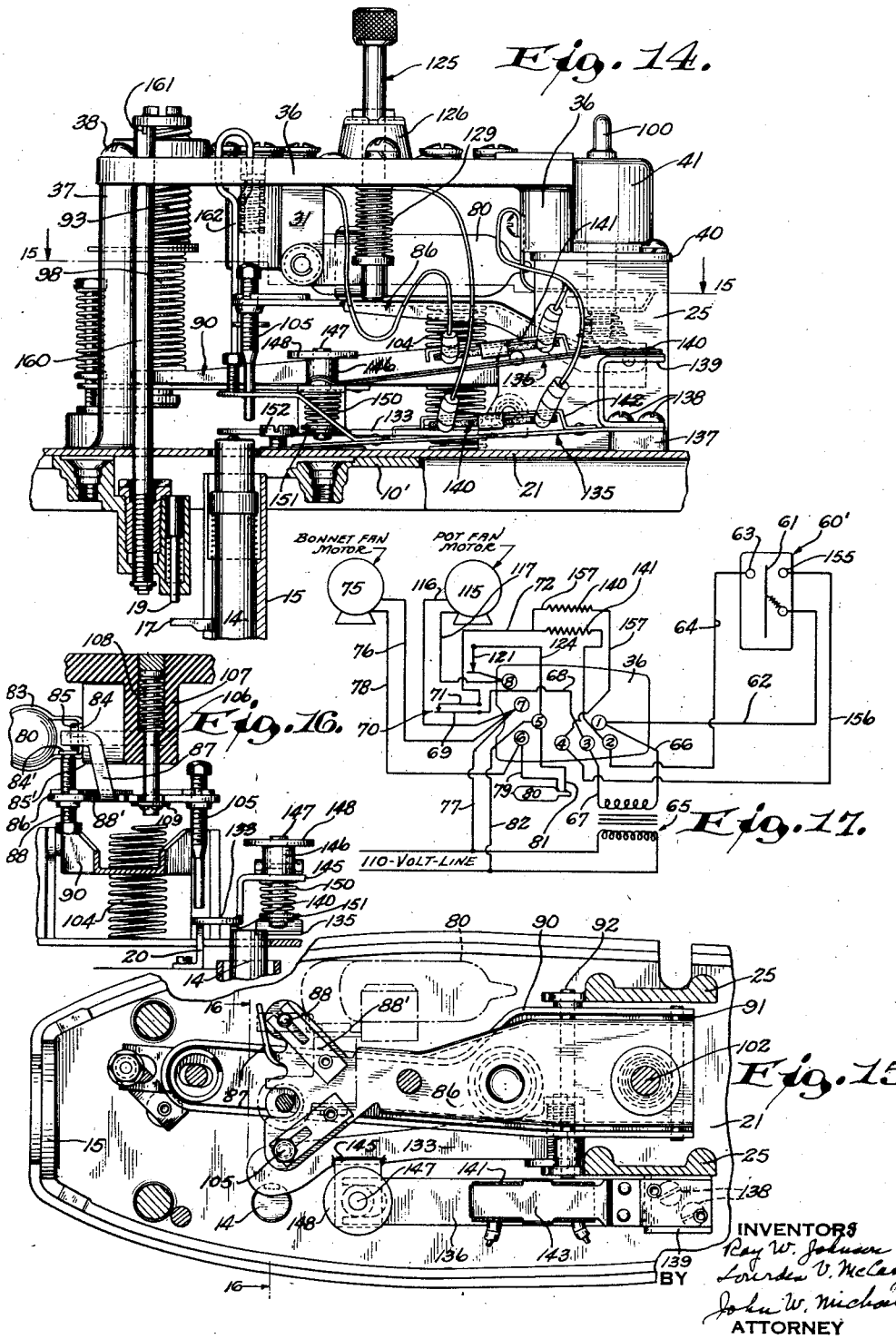

Patented June 9, 1942

2,286,137

UNITED STATES PATENT OFFICE 2,286,137

FURNACE CONTROL

Roy W. Johnson and Lourdes V. McCarty, Milwaukee, Wis., assignors to Automatic Products Company, Milwaukee, Wis., a corporation of Wisconsin Application July 10, 1939, Serial No. 283,550

10 Claims. (Cl. 236—9)

This invention relates to an improvement in controls especially designed and adapted for use with heaters of the type wherein the heater is fired by a liquid fuel or oil burner.

A typical installation is in connection with a hot air furnace employing a pot type burner, or its equivalent, to which oil or liquid fuel is fed by gravity under the control of a metering valve. Air to support combustion is fed to the combustion chamber, in many instances, by means of an electric motor-driven fan, and the air heated by the furnace is circulated through the building or spaces to be heated usually also by means of a motor-driven fan or blower.

The present invention proposes to control the feed of the fuel to the burner automatically in such manner as to maintain the compartments or spaces to be heated at the selected temperature. In carrying out this purpose the metering valve is biased to open position, and its extreme positions are regulated by high and low fire stops. Usually the high fire stop coacts directly with the valve, and the low fire stop is in cooperative relation to the valve-operating lever so as to limit the throw of the lever in the direction to close the valve. The valve-operating lever is in turn controlled as to its position by means of an electric motor or electrically energized power element, which may take the form of an electromagnet, or one or more thermostatic leaves or bi-metallic elements which have electric heating elements combined therewith, or an expansion fluid motor energized by an electric heating element in heat interchanging relationship with its expansible fluid; the electric motor, irrespective of what form it may take, being controlled in its action by a room thermostat. Of course, auxiliary or safety control devices may also be employed, if desired.

Where an electro-magnet is employed usually there is only a two stage fuel feed—that is, the valve is positioned to maintain a pilot flame or low fire when the room thermostat is satisfied and the electro-magnet is deenergized, whereas when the room thermostat is calling for heat and the electro-magnet is energized, the valve is positioned to provide for a high fire.

In installations where air to support combustion is supplied to the combustion chamber or fire pot by means of a motor-driven fan, the present invention proposes to combine the pot fan switch with the electro-magnet which controls the position of the metering valve in such a way as to have the pot fan motor circuit automatically closed when the metering valve is fully opened, and automatically broken when the valve is in pilot position.

By utilizing two combination bi-metallic elements and electric heating elements which are successively energized under the control of the room thermostat, it is practical to have a three stage fuel or oil feed, that is, a pilot fire or a low fire, an intermediate fire or flame, and a high fire. This is accomplished by having one of the bi-metallic elements, acting under the influence of its inherent resiliency, cause the valve operating lever against the low fire stop when the heating elements of both bi-metallic elements are deenergized. As the demand for heat increases, the bi-metallic elements are successively warped or flexed under the influence of their respective elastic heating elements to partially and then fully open the metering valve.

The invention also proposes to provide a novel and advantageous automatic control for the electric motor of the circulating fan and to interrelate this control in a special and advantageous manner with the fuel feeding mechanism. The control device includes a tiltable mercury switch incorporated in the circulating fan motor circuit and opened and closed by means of a switch operating lever, the switch lever being in turn automatically shifted by means of a power element of the bellows type, which is connected by a capillary tube to a control bulb inserted in the bonnet of the furnace. The bellows, capillary tube, and bulb are filled or charged with a fluid whose volume changes with changes in temperature so that on a predetermined rise in temperature of the air in the bonnet of the furnace the bellows will expand and act on the switch lever to shift the same and cause the mercury switch to tilt and close the circuit through the circulating fan motor. After the fan has been in operation for a time, and the temperature in the bonnet of the furnace drops a predetermined amount, the consequent shrinkage in volume in the volatile fluid in the bellows and its associated elements will allow the switch operating lever, under the influence of its biasing spring, to return to such position as to tilt the mercury switch to open position. In order to provide for adjustable range of the temperatures upon which the circulating fan is thrown in and out, the switch lever is supported or fulcrumed upon a fulcrum lever, controlled as to its position by manually adjustable means.

Where the operation of the circulating fan is effected by a power element of the bellows type it is desirable to make provision for the automatic return of the metering valve to pilot position, and this independently of the demands of the room thermostat, in the event the bellows leak or fail for other reasons. The present invention makes provision for this by incorporating a fail-safe switch in the circuit of the motor which controls the metering valve, and controlling the fail-safe switch by the bellows, so that while the switch is normally closed it is automatically opened if the bellows fail.

Another important feature of the invention is to have the switch operating lever operatively interrelated with the valve operating lever so that if the temperature in the bonnet of the furnace continues to rise above a predetermined value, the further movement of the switch operating lever will be transmitted to the valve operating lever first to cause it to throttle or meter down the flow of oil, and if this does not correct or retard the progressive rise in temperature satisfactorily, the valve operating lever is forced against the low fire stop and the furnace thrown on pilot flame.

Another object is to provide a control device which has these advantages and capacities, and which is very closely and compactly organized, extremely simple in construction, thoroughly reliable and efficient in operation, and easy and comparatively inexpensive to manufacture, install and maintain.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 6 is a fragmentary detail view taken partly in side elevation and partly in vertical section, illustrating the way in which the loading spring is combined with the adjusting lever or shiftable fulcrum of the switch operating lever;

Figure 7 is a perspective view of the device illustrated in the preceding figures;

Figure 8 is a view in top plan of the terminal board and associated parts, the bellows or power element for actuating the fan switch operating mechanism being omitted to illustrate the fail-safe switch combined therewith;

Figure 9 is a view in side elevation of the part shown in Figure 8;

Figure 10 is a view in bottom plan of the structure shown in Figures 8 and 9;

Figure 11 is a view in transverse cross section taken along line 11—11 of Figure 10, with the parts shown in elevation for the sake of illustration;

Figure 12 is a diagram showing the electrical circuit with which the control device, illustrated in Figures 1 to 11, is combined when a combustion or pot fan switch, as well as bonnet fan switch and fail-safe switch, are employed;

Figure 13 is a diagram similar to Figure 12, but showing the wiring employed when the pot fan switch and its motor are eliminated or omitted;

Figure 14 is a view partly in side elevation and partly in longitudinal vertical section, showing a modified type of furnace control, one wherein the electro-magnet for actuating the valve operating lever is replaced by a pair of bimetallic elements and associated electric heating elements;

Figure 15 is a view in horizontal cross section taken on line 15—15 of Figure 14;

Figure 16 is a view in vertical cross section, taken on line 16—16 of Figure 15; and Figure 17 is a diagram showing the electrical circuit with which the control device illustrated in Figures 14, 15 and 16 is combined.

Figure 2:
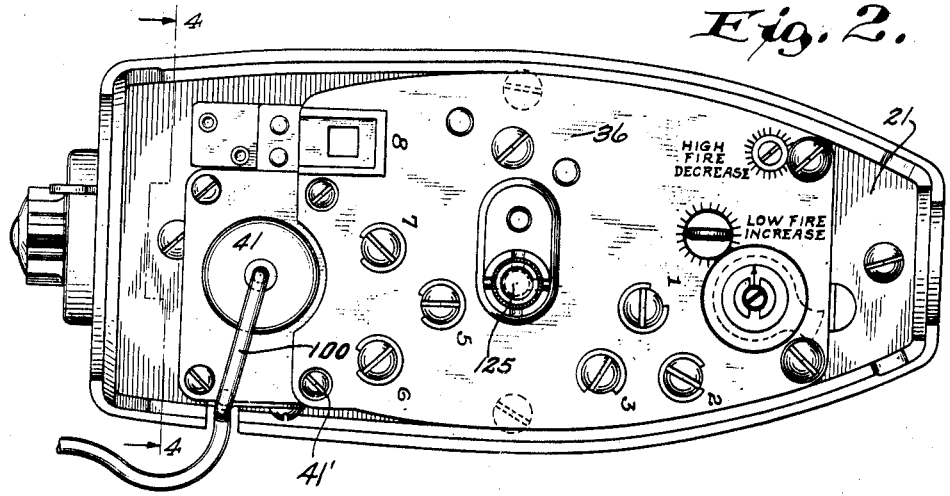
Figure 2 is a view in top plan of the device shown in Figure 1, with the cover of the control casing removed to illustrate the terminal board of the device.
Figure 1:
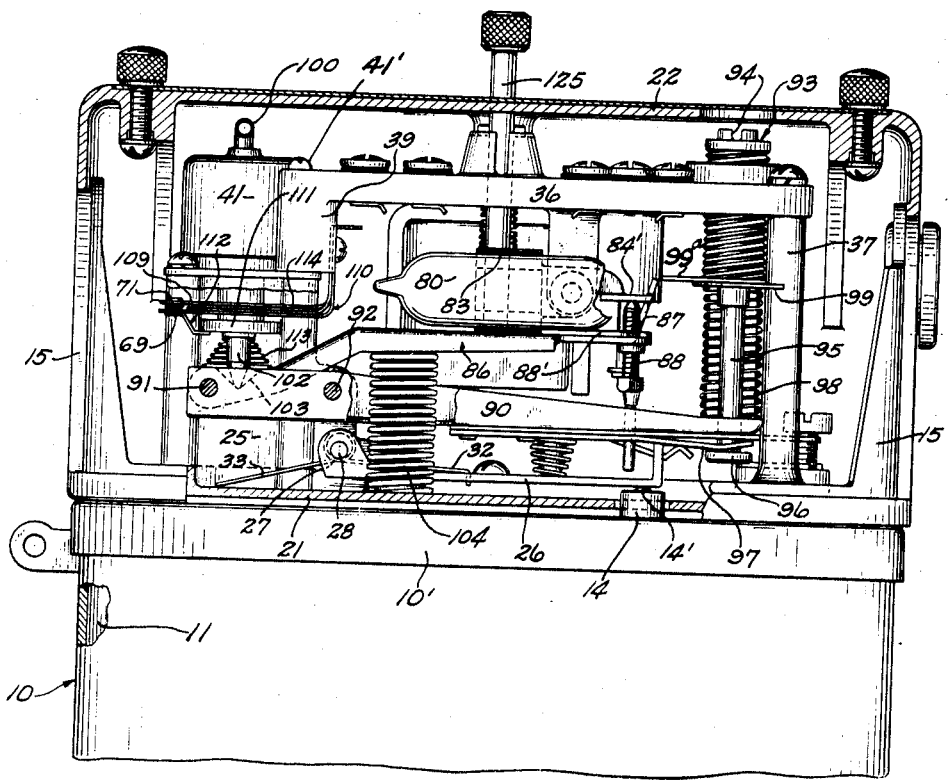
Figure 1 is a fragmentary view, partly in side elevation and partly in longitudinal vertical section, showing a furnace control embodying the present invention, and of the type where the electric motor for actuating the valve operating lever is in the form of an electro-magnet.
Figure 3:
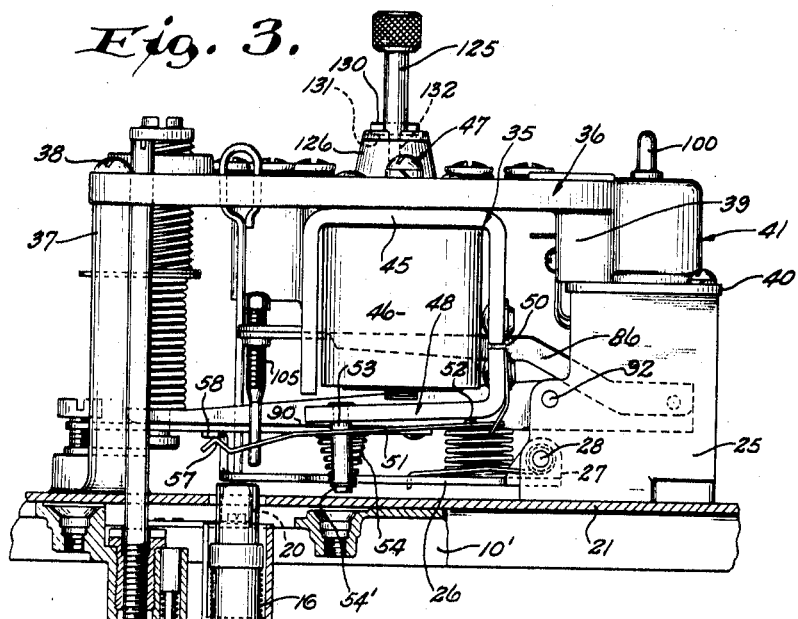
Figure 3 is a fragmentary view partly in side elevation and partly in longitudinal vertical section, and viewing the opposite side of the device from that shown in Figure 1, and also illustrating a portion of the metering valve.

Referring to the drawings, and more particularly to Figures 1, 3 and 7, it will be seen that the furnace control device embodying the present invention comprises a main casing 10 having a main liquid supply chamber 11 therein. Liquid fuel is supplied to the chamber through an inlet 12 from a reservoir and a constant level is maintained in the liquid supply chamber by mechanism such as is disclosed in United States Letters Patent No. 2,068,138 to Roy W. Johnson, granted January 19, 1937. The liquid supply chamber 11 is provided with one or more outlets 13 leading to the burner, usually a pot type burner (not shown), and flow through each of these outlets is regulated by means of a tubular metering valve 14, which is fitted in a tubular valve guide 15, biased to open position by means of a spring 16, and guided by a radially projecting pin 17 which works in a vertical guide slot in the guide tube 15. The construction of this metering valve and also of its high fire stop 19 and low fire stop 20, except in particulars which will be hereinafter described, is fully disclosed and claimed in Patent 2,244,161, to Roy W. Johnson for "Interchangeable metering valve controls," issued June 3, 1941.

The upper end of the metering valve 14 projects up through an opening provided in the cover 10' of the casing 10 and also through an opening provided therefor in the base plate 21 of the casing of the control mechanism. The base plate 21 is fastened in position on the cover of the main casing and has integral with its ends uprights 15. A control cover 22 of shell-like form coacts with the base plate 21 and the uprights 15 to complete the enclosure of the control parts. Screws or other suitable fastening devices are employed for securing the base plate in position and releasably securing the control casing cover to the base plate.

Figure 4:
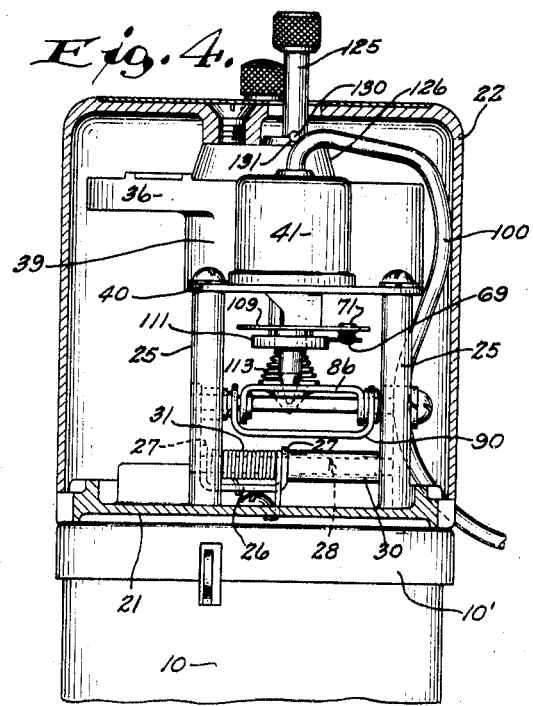
Figure 4 is a fragmentary view in transverse vertical section taken on line 4—4 of Figure 2, with parts shown in elevation for the sake of illustration.

A pair of transversely spaced vertical bracket plates 25 are integrally formed with the base plate 21 adjacent one end thereof. A valve operating lever 26, which may be constituted of sheet metal, is formed at one end with a pair of spaced and apertured ears 27 (see Figures 1, 3, and 4). A pivot pin 28 supported on the bracket plates 25 extends through the apertures of the ears 27 to pivotally suport or fulcrum the valve operating lever at one end thereof. A spacing sleeve 30 is interposed between one of the ears 27 and one of the bracket plates 25 to maintain the operating lever 26 in its proper position transversely, although this arrangement leaves it free to swing about its fulcrum pin 28. The end of the valve operating lever 26 opposite its fulcrum 28 overlies the upper end of the metering valve 14, and also overlies the low fire stop 20, so that when the lever 26 is allowed to swing downwardly it presses against a boss 14' formed on the upper end of the metering valve and so causes the metering valve to shift to low or pilot fire position against the action of its spring 16. When the lever 26 has shifted the valve 14 to low fire position, the lever comes into engagement with the low fire stop 20, and any further downward movement of the lever is prevented. A torsion coil spring 31 encircles a portion of the pin 28 between the ears 27 of the valve 26, and has one end 32 bearing down on the valve operating lever and its other end 33 abutting the base plate 21 so that the tension of the spring 31 tends to swing the end of the valve operating lever engageable with the metering valve 14 downwardly. The torsion spring 31 is stronger than the valve spring 16 so that when the torsion spring 31 is free to act it overcomes the effect of the spring 16. In order to provide for the lifting of the valve operating lever 26, and have the metering valve 14 open under the influence of its spring 16, an electro-magnet, designated generally at 35, is provided, and is operatively connected to the valve operating lever 26 in the manner which will be hereinafter fully described.

A terminal board 36 of Bakelite, or other insulating material, and of generally plate-like form, is supported within the control casing on the bracket plates 25 and on vertical posts 37 provided therefor. Screws 38 secure one end of the terminal board in position on the posts. The opposite end of the terminal board has a depending lug-like and integral extension 39, which rests on the flange 40 of a bellows or power element 41. This bellows or power element and its function will be later described, but is referred to at this point because of the interpositioning of its flange between the underside of the lug 39 of the terminal board 36 and the top of the bracket plates 25. Screws 41' pass through openings provided in the terminal board in the lug 39 and in the flange 40, and thread into sockets in the bracket plates 25 to fasten the terminal board, and also the power element or bellows 40, in position.

The electro-magnet 35 has a U-shaped frame 45 which extends about the windings 46 of the magnet. A screw and washer 47 fasten this frame and the windings to the terminal board. The electro-magnet 35 also includes a swingable armature 48 of L-shape interconnected with one of the legs of the frame 45 by a blade or leaf spring 50, which has its end portions secured by rivets or eyelets to the leg of the frame 45 and to a leg of the armature 48, respectively. This permits a limited swinging movement of the armature, and also provides a means to bias the armature 48 to swing away from the pole face on the core of the windings. A spring finger 51 is provided at one end with a boss 52 which bears against the underside of the armature 48. Centrally it is provided with an opening through which a stud 53 fixed to the armature 48 extends. A coil spring 54 encircles the portion of the stud below the finger-piece 51, and has its upper end bearing against the underside of the finger 51 and its lower end abutting a snap ring 54' engaged in an annular groove in the lower end of the stud. This construction normally constrains the finger 51 to swing with the armature 48 but allows a limited relative movement between these parts, the spring 54 flexing for this purpose. Disengagement or derangement of the connection between the spring finger and the armature is further provided against by forming the blade or leaf spring 50 with a slotted extension 55 through which a reduced extension 56 of the spring finger 51 extends, and in which it is loosely interfitted.

One end of the spring finger 51 is of angular formation, as indicated at 57, and engages under an angular extension 58 which may be formed integrall with the valve operating lever. With this construction it is obvious that when the magnet 35 has its windings 46 energized, the armature 48 will be pulled upwardly, thereby carrying the spring finger 51 with it, and the finger 51 acting through its extension 57 will press upwardly on the angular extension 58 of the valve operating lever 26, thereby swinging the lever upwardly and allowing the metering valve 14 to open under the influence of its spring 16.

The energization and de-energization of the coil 46 of the electro-magnet 35 is controlled by room thermostat illustrated diagrammatically and designated generally at 60 in Figures 12 and 13. As shown in these figures, the blade 61 or bi-metallic element of the room thermostat 60 is connected by wire 62 to binding posts numbered 1 on the terminal board 36. The red contact 63 of the room thermostat is connected by wire 64 to binding post 2 of the terminal board. The low voltage circuits of the control device are energized from the line through a step-down transformer shown diagrammatically at 65, one of the terminals of the secondary coil of the step-down transformer 65 being connected by wire 66 to the binding post 1 of the terminal board. The other terminal of the secondary coil of the transformer 65 is connected by wire 67 to the binding post 3 of the terminal board. From this binding post 33 a wire or conductor 68 leads to one of the contacts 69 of the fail-safe switch designated generally at 70. The details of this fail-safe switch will be hereinafter more fully described, but for present purposes it is sufficient to understand that it includes the contact 69 and also a cooperable contact 71 which is connected by means of the wire 72 to one terminal of the winding 46 of the electro-magnet 35. The other terminals of this winding 46 are connected by means of a wire 73 to binding post 2 of the terminal board.

With this construction, when the thermostat calls for heat, its blade is in contact with the red contact 63 and current will flow from the secondary of the step-down transformer through wire 66, binding post 1, wire 62, through the blade 61, through red contact 63, wire 64, binding post 2, wire 73, the winding 46 of electro-magnet 35, wire 72, contacts 71 and 69 of the fail-safe switch, wire 68, binding post 3, and wire 67, back to the secondary of the transformer. This energizes the electro-magnet and allows the metering valve to move to high fire position. Consequently, generation of heat in the furnace is accelerated so that the temperature in the bonnet of the furnace gradually rises. After it has risen to a predetermined amount, the present invention proposes to turn on automatically a so-called bonnet fan motor, whereby a fan or blower will be driven and caused to circulate the heated air from the bonnet of the furnace through the circulating elements or ducts of the system.

Continuing to refer to Figures 12 and 13, the bonnet fan motor is diagrammatically illustrated at 75. One terminal of the motor is connected directly to one side of the source of current, as for example by means of a wire 76 leading from a motor terminal to binding post 7 on the terminal board 36. Binding post 7 is connected directly by means of wire 77 to one side of the 110 volt line. The other terminal of the bonnet fan motor is connected by wire 78 to binding post 6 on the terminal board. Binding post 6 is connected by means of a wire 79 to one of the electrodes of a mercury switch 80. The other electrode of this switch is connected by means of a wire 81 to binding post 5 on the terminal board 36. Binding post 5 is connected by means of wire 82 to the opposite side of the 110 volt line. With this construction, when the mercury switch 80 is tilted to cause its body of mercury to bridge its electrodes, and the switch is closed, the fan motor 75 will be connected across the 110 volt line, and the motor will be driven. When the switch 80 is reversely tilted, and the conductive path between its electrodes is broken, then the circuit through the motor 75 will be broken and the motor will stop.

The present invention provides means regulated in its action by the temperature in the bonnet of the furnace for controlling the position of the mercury switch 80.

The switch 80 is supported intermediate its ends in a spring clip 83, which is riveted to one end of a short rock arm 84 (see Figures 9 to 11, and 16.) Intermediate its ends the rock arm 84 is mounted on a pivot pin 85 which is rotatably supported in a sleeve-like bearing 85' provided therefor, and which may be formed or molded integral with the underside of the terminal board. A portion 84' of the rock arm 84 projects on the opposite side of its pivot from the clip 83, and is adapted to have driving connection with a switch operating lever 86. In the practical construction illustrated, this driving connection between the lever 86 and the portion 84' of rock arm 84 of the mercury switch 80 is had by bending or forming from one end of the switch lever 86 and angular finger 87 shaped as best shown in Figures 15 and 16, the finger extending over and being engageable with the portion 84' of the rock arm 84. A screw 88 is threadedly connected with the portion of the switch lever 86 which underlies the horizontally extending part of the angular finger 87, and confines the rock arm of the switch between itself and such part of the angular finger. A slotted spring clip 88' is riveted to the lever 86, and is frictionally engaged with the screw 88 to releasably secure the screw in any of its various adjustments.

The lever 86 is mounted on a shiftable fulcrum which in this instance takes the form of an adjusting or supporting lever 90. One end of the switch lever 86 is pivotally mounted or fulcrumed upon the lever 90, as indicated at 91. The lever 90 in turn is pivotally supported or fulcrumed on the bracket plates 25 by means of a pivot or fulcrum pin 92.

In order to provide for an adjustment of the cut-off temperature of the bonnet fan motor, provision is made to adjust the supporting lever 90 about its fulcrum 92. As a consequence, the fulcrum 91 of the switch operating lever is shifted, and this varies the cut-off temperature since it changes the point to which the switch 80 must be tilted to effect operation. In the construction proposed to accomplish this purpose a screw 93 is provided and is threadedly interconnected with a threaded bearing provided therefor in the terminal board. The upper end of the screw is provided with a cross slot 94 to facilitate its turning by a screw driver or the like. The slotted upper end of the screw 93 is accessible through an aperture in the top of the control cover 22 when the cover plate 22' thereof is removed. Proper adjustment of the screw 93 may be facilitated by providing a temperature scale on the top of the control cover 22 and around the margin of its aperture. A stud or pin 95 is fixedly secured to the lower end of the screw and extends down through an opening in the underlying end of the valve-supporting lever 90. Below the lever 90 the pin or stud 95 is formed with a head 96. An extension strip 95' is secured to the underside of the supporting lever 90 and has its outer end notched and straddling the shank of a stop screw 96' adjustably threaded into the base plate 21. Screw 96' limits the movement of lever 86 in one direction. A spring finger 97 may be provided between the head 96, and the underside of the valve-adjusting lever, to provide a protective cushion, desirable under some circumstances. To hold the supporting lever 90 down against the spring finger 97, and against the head of the pin or stud 95, a coil spring 98 is provided and has its lower end bearing against the portion of the lever 90 which overlies the head 96, and has its upper end engaged under a washer 99 which is rotatably fitted about the connection between the upper end of the stud 95 and the lower end of the screw 93, and has a bifurcated or forked extension which rides along one of the posts 37. Above the washer 99 a stop arm 99a is fixed to the screw and is engageable with the opposite sides of the post 37 to limit the turning movement or angular movement of the screw 93 in either direction.

The valve-operating lever 86 is swung about its fulcrum pin 91 under the control of a heat responsive power element, which in the present instance is the bellows 41 previously referred to. The bellows has a capillary tube 100 connected thereto and also connected to a bulb 101, which is disposed within the bonnet of the furnace. The bellows 41, capillary tube 100, and bulb 101 are charged with a volatile fluid, which expands and contracts in accordance with temperature changes, and, of course, expands or contracts the bellows. The expansion and contraction of the bellows is transmitted to the valve-operating lever 86 through a pointed motion transmission pin 102, which bears against a V-shaped seat 103 provided therefor on the switch-operating lever 86. A loading spring 104 is provided for the valve-operating lever 86 and opposes the action of the bellows, the lower end of the loading spring abutting against the base plate 21, the upper end of the spring pressing upwardly against the lever 86. The valve-adjusting or supporting lever 90 has an opening through which the spring 104 loosely or freely extends.

With this construction, when the temperature in the bonnet has arisen to a predetermined value, the charge in the bulb 101, capillary tube 100, and bellows 41 has expanded to such extent that the bellows 41, acting through the pointed motion transmission element 102, will have rocked the lever 86 in a clockwise direction, as viewed in Figure 1, to such extent as to tilt the mercury switch over to a position wherein its body of mercury will bridge its electrodes. This will complete the circuit through the bonnet fan motor 75, and the bonnet fan will start up and begin to circulate the air or heat circulating medium out of the bonnet of the furnace and through the heat distributing system.

If, however, the temperature continues to rise in the bonnet of the furnace, the continued expansion of the charge in the bellows 41, bulb 101, and tube 100 will further swing the lever 86 in a clockwise direction, as viewed in Figure 1, and if this action progresses far enough a screw 105 carried by a lateral extension of the lever 86, and overlying the valve operating lever 26, will eventually come into contact with the valve-operating lever, pressing the same downwardly to gradually move the metering valve 14 toward closed position. This first throttles the supply of oil to the burner, and if heat in the bonnet of the furnace continues to rise will eventually move the valve 14 to pilot or low fire position, and this independently of the room thermostat.

The action of the switch operating lever in thus taking over the control of the metering valve is dampened or steadied by means of a dash pot arrangement which may take the simple form of a plunger 106 vertically movable in a cylindrical guideway 107 provided therefor on the terminal board. In the guideway and beneath the head of the plunger is a coil spring 108, the coil spring resisting downward movement of the plunger. The plunger extends down to a point below the front end of the lever 86, and has a washer or head 109 on its lower end which underlies the adjacent portion of the lever 86 so as to be engaged thereby when the lever moves downwardly beyond the extent necessary to close the fan motor circuit. In other words, continued downward movement of the lever 86, which will eventually result in the lever 86 taking over the control of the metering valve 14, is resisted by the action of the spring 108 and its plunger.

The fail-safe switch, previously referred to in connection with the diagram of Figures 12 and 13, is combined with the bellows or power element 41. The contact 71 of the switch is carried by an L-shaped spring metallic conducting member 109, the long leg of which is fastened to the lug 39 of the terminal board 36, and is also connected to one end of the wire 72 leading to the coil 46 of the magnet. The contact 71 overlies the contact 69. The contact 69 is carried by an angular conducting member of spring metal, designated at 110, which is also fastened to the lug 39 of the terminal board 36 and is connected by the wire 68 to the binding post 3 of the terminal board. The spring carrier members 109 and 110 for the contacts 71 and 69, respectively are angularly shaped, and so shaped in different planes, the carrier 109 being L-shaped in horizontal plane, the carrier 110 being angular in a vertical plane. The carrier 109 is so shaped and tensioned that it tends to disengage its contact 71 from the contact 69 in the manner illustrated in Figure 9. In the assembly, if and as long as the bellows is charged, it is expanded and held down against its own inherent resiliency to such extent that the contact 71 is engaged with the contact 69. This is accomplished by fixing a collar 111 to the motion transmission element 102 of the bellows and having the collar 111 engage over a tongue 112 which is integral with the short leg of the contact carrier 109. If the bellows leaks and loses its charge, the collar 111 is forced upwardly by a spring 113 interposed between it and the switch lever 86. This allows the tongue 112 to follow it and permits the carrier 109 to swing the contact 71 away from the contact 69. Since the position of the carrier 109, and consequently of the contact 71, depends to some extent upon the ambient temperature, a bi-metallic strip 114 is also fixed to the lug and overlies and bears against the contact carrier 110 so that as the position of the carrier 109 and its contact changes, due to the effect of ambient temperature changes on the bellows, there will be a corresponding change in the position of the contact carrier 110 and its contact 69 due to the action of the strip 114.

In some installations it is desirable to supply air under the action of an electric motor-driven fan to the combustion chamber or pot of the burner when the metering valve is shifted to high fire position, and the present invention makes provision for this.

Figure 5:
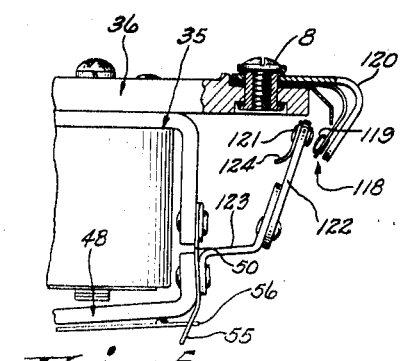
Figure 5 is a fragmentary view partly in side elevation and partly in vertical section, showing how a pot fan or combustion fan switch may be combined with the electro-magnet.

Referring now to Figure 12, the numeral 115 designates generally and diagrammatically a pot fan motor. One terminal of this motor is connected by means of wire 116 to the binding post 7 on the terminal board 36, and hence is connected directly to one side of the 110 volt line. The other terminal of the motor is connected by wire 117 to binding post 8 provided on the terminal board 36. A pot fan motor switch (see Figure 5 also), designated generally at 118, is provided, and has a fixed contact 119 connected to the binding post 8 and protected by guard 120. The movable contact of this switch is designated at 121, and is supported on an insulating strip 122 carried by a bracket 123 riveted to the armature 48 of the electro-magnet 35. The movable contact 121 is connected by flexible wire 124 to the binding post 5, and hence to the other side of the 110 volt line. As shown in Figure 5, when the magnet 35 is de-energized, and the armature 48 swings away from the pole face thereof, the switch 118 is opened and the pot fan motor de-energized. However, when the electro-magnet 35 is energized, and its armature 48 is pulled upwardly to allow the metering valve to move to high fire position, contacts 121 and 119 are engaged, and the pot fan motor circuit is closed.

In some installations it is desirable to utilize the control device, especially the bonnet fan, for circulating the cool air in the cellar or basement throughout the house in the summertime, the burner, of course, being completely shut off or extinguished at such times. To accomplish this purpose, the room thermostat is adjusted to a setting below that of the room temperature, and the switch lever 86 is moved to and held in a position to tilt the mercury switch 80 in such a manner as to cause its body or globule of mercury to bridge the electrodes of the switch, thereby closing the bonnet fan motor circuit and effecting a continuous operation of the fan. The movement of the switch lever 86 to, and its maintenance in, the position just described may be very conveniently and simply effected by the use of a spring biased plunger 125 vertically disposed and slidably fitted in a bearing 126 which may be formed or moulded as an integral part of the terminal board 36. The lower end of the plunger 126 is equipped with a washer 127, which may be held in position thereon by cross pins 128. The biasing spring for the plunger is designated at 129, and is interposed between the washer 127 and the underside of the terminal board.

For winter operation the plunger 125 is pulled upwardly out of engagement and out of range of movement of the switch lever 86, and it is releasably retained in operative position by means of a cross pin 130 extending transversely through an opening in the upper portion of the plunger and engageable in notches 131 in the upper end of the bearing 126 when the plunger is retained in its upper inoperative position. To allow the plunger to shift the lever 86 to the position for summer operation, the plunger 125 is first pulled upwardly, then turned through ninety degrees to position the pin 130 in alinement with vertical slots 132 in the bearing 126, whereupon the plunger may be lowered until the pin 130 engages the bottoms of the slots 132.

The form of the invention shown in Figures 14 to 17, inclusive, is identical, except as will be hereinafter pointed out, with the structure previously described. It employs the same metering valve 14 which is biased in open position by a spring 16, and is controlled in its action by a valve-operating lever 133, which in all major respects is identical with the lever 26, and is merely changed to adapt it for actuation by two bi-metallic elements having electric heating elements combined therewith rather than by an electric magnet. The structure providing for controlling the operation of the bonnet fan motor, and the interlocking of this control with the control of the metering valve, is identical with that previously described, so that the foregoing description applies to this form of invention also.

As indicated, the electric magnet 35 is omitted, and in its place two bi-metallic elements, one designated at 135 and the other designated at 136, are provided. The bi-metallic element or thermostatic leaf 135 is fastened at one end to a pad 137 formed integrally with one of the bracket plates 25, and it is held in position thereon by screws 138, which also serves to fasten in position a small U-shaped bracket 139. The bi-metallic element or thermostatic leaf 136 is secured to the upper horizontally disposed leg of this bracket 139. The electric heating elements, designated at 140 and 141, are mounted on the thermostatic leaves or bi-metallic elements 135 and 136, mounting strips 142 and 143 being provided for this purpose. The electric heating elements are disposed on the underside of said mounting strips so as to be closely adjacent their respective bi-metallic elements, and in effective heating interchanging relation therewith, but, of course, they are electrically insulated from their bi-metallic elements.

The valve-operating lever 133 is fulcrumed or pivotally mounted on plates 25 in exactly the same way as the valve-operating lever 26 in the other forms of the invention, and the end of the lever remote from its fulcrum overlies the metering valve stem and low fire stop as before. Adjacent its free end the lever 133 has integrally formed with one of its edges an angular bracket 145, the horizontal portion of which is provided with an opening to the margin of which a short vertically disposed sleeve 146 is secured. A pin 147 is slidably fitted in the sleeve 146, and has a disc or plate 148 secured to its upper end and engageable with the upper end of the sleeve 146 to limit the downward sliding movement of the pin 147. The pin 147 projects downwardly below the bracket 145, and this downwardly projecting portion is surrounded by a coil spring 150, the upper end of the spring 150 abutting the under side of the horizontal portion of the bracket, and the lower end thereof engaging a washer or collar 151 which is appropriately fastened to the pin. The free end of the upper bi-metallic element or thermostatic leaf 136 is notched or bifurcated and straddles the sleeve 146, and underlies the plate 148 secured to the upper end of the pin 147. The parts are so constituted that when the electric heating element 141 is de-energized the bi-metallic strip 136, under the influence of its own inherent resiliency, will warp down against the horizontal portion of bracket 145, and will be spaced from the plate or disc 148, as shown in Figure 14. However, when the electric heating element is energized, the bi-metallic element leaf 136 will flex upwardly until it engages the disc or plate 148, and elevates this disc or plate 148 and also the valve-operating lever 133, due to the connection of the plate through the pin 147 and spring 150 with the bracket 145 of the lever.

The lower end of the pin 147 overlies the outer end of the lower thermostatic leaf or bi-metallic element 135, so that when its electric heating element 140 is de-energized, and the leaf under the influence of its own inherent resiliency warps upwardly, it will engage the pin 147 and lift it and the lever 133 up to an intermediate firing position. When the electric heating element 140 is energized, the bi-metallic element 135 warps downwardly, moving the lever 133 to the pilot position. The motion of the valve-operating lever under the influence of the thermostatic leaf 135 is limited by a stop screw 152, the head of which overlies the outer end of the leaf 135.

With this construction a three-position thermostat, shown at 60' in Figure 17, is employed. this thermostat, and the circuit with which it is combined, are identical with the system shown in Figure 12, save that the thermostat has a blue contact 155 as well as the red contact 63, and the blade 61. The blue contact 155 is connected by wire 156 with the terminal 4 of the terminal board 36. Terminal 4 is connected by wire 157 with the electric heating element 140. The opposite end of the heating element 140 is connected by wire 157 with the wire 72, which connects with the fail-safe switch and back to the other side of the secondary of the transformer. The electric magnet 35 is, as pointed out, eliminated, and in place of connecting its coil in the circuit, in the manner previously described, the electric heating element 141 is hooked up in the circuit. As shown in Figure 17, this is accomplished by connecting one terminal of the heating element 141 with the terminal 2, and the other terminal thereof with wire 72.

In the middle position of the blade 61 both electric heating elements are de-energized and the metering valve is held in intermediate fire position. When the blade engages the blue contact 155, electric heating element 140 is energized, and the metering valve moved from intermediate fire to pilot position. If the blade 61 engages the red contact 63, then the electric heating element 141 is energized and the metering valve moved to full open or high fire position.

As previously indicated, the high and low fire stops per se form no part of the present invention as they are the subject matter of the application of Roy W. Johnson for "Interchangeable metering valve control," Serial No. 215,336, filed June 23, 1938, but in this type of structure the adjustment of the high fire stop, provided for in the field, is facilitated by connecting an elongated stem 160 to the adjustable high fire stop sleeve and extending this stem up through the top of the terminal board. A cross-slot 161 is provided in the upper end of the stem 160. A screw driver or the like may be employed with the slotted upper end of the stem 160 to effect adjustment of the high fire stop.

Similarly, the adjustment of the adjusting screw, which flexes the strip of the low fire stop, is facilitated by connecting to this screw an operating wire 162, which extends up through an opening in the terminal board, and is accessible from thereabove.

While we have shown and described several constructions in which my invention may be advantageously embodied, it is to be understood that these structures have been selected for purposes of illustrations and example, and that various changes in the size, shape, and arrangement of parts may be resorted to, as will be understood to those skilled in the art, without departing from the spirit of the invention and the scope of the subjoined claims.

We claim:

1. A control for a furnace having a burner and an electric motor-driven fan for effecting forced circulation of the medium heated by the furnace and comprising a metering valve biased to open position and regulating the flow of fuel to the burner, a valve operating lever engageable with the valve to move it toward closed position when swung in one direction and to allow it to open when swung in the opposite direction, an electrically energized power element for actuating said lever, a room thermostat for controlling the energization of said power element, a switch for regulating the operation of said electric motor-driven fan, a switch operating lever, thermostatic means responsive to the temperature of the heat circulating medium in the furnace for actuating said switch lever, a portion of said switch lever overlying the valve operating lever, and a screw mounted on said portion of the switch lever and engageable with the valve operating lever to cause the same to move the metering valve toward closed position, said switch-operating lever having sufficient movement to first operate said switch and thereafter to effect operation of said valve-operating lever upon a continued rise of temperature of the heat circulating medium.

2. A control for a furnace having a burner and an electric motor-driven fan for effecting forced circulation of the medium heated by the furnace and comprising a metering valve biased to open position and regulating the flow of fuel to the burner, a valve operating lever engageable with the valve to move it toward closed position when swung in one direction and to allow it to open when swung in the opposite direction, an electrically energized power element for actuating said lever, a room thermostat for controlling the energization of said power element, a switch for regulating the operation of said electric motor-driven fan, a switch operating lever, thermostatic means responsive to the temperature of the heat circulating medium in the furnace for actuating said switch lever, a portion of said switch lever overlying the valve operating lever, and a screw mounted on said portion of the switch lever and engageable with the valve operating lever to cause the same to move the metering valve toward closed position, said switch-operating lever having sufficient movement to first operate said switch and thereafter to effect operation of said valve-operating lever upon a continued rise of temperature of the heat circulating medium, in combination with a dash pot cooperable with the switch operating lever to dampen its movement as its screw approaches engagement with the valve operating lever.

3. A control for a furnace having a burner and an electric motor-driven fan for effecting forced circulation of the circulating medium heated by the furnace and comprising a valve for controlling the flow of fuel to the chamber, thermostatically controlled means regulating the opening and closing of the valve and including a room thermostat, and an electro-responsive motor means energized under the control of the room thermostat, thermo-responsive means subjected to the temperature of the heat circulating medium and having a power element including a bellows, a switch for regulating the operation of said electric motor-driven fan, a switch operating lever between the bellows and said switch, and a fail-safe switch including a movable contact biased to disengage a fixed contact, and means controlled by the bellows for maintaining said contacts engaged except upon collapse of the bellows, the contacts of said fail-safe switch being connected in controlling relation in the circuit of the electro-responsive motor means.

4. A control for a furnace having a burner and comprising a single metering valve biased to open position and regulating the flow of fuel to the burner, a valve operating lever overlieing the valve and engageable therewith to move the valve toward closed position when swung in one direction and to allow the valve to open when swung in an opposite direction, two thermostatic leaves mounted one above the other in proximity to said valve operating lever, an electric heating element associated with each thermostatic leaf, a room thermostat for selectively energizing said heating elements, yieldable connecting means between one of said thermostatic leaves and said lever, the other of said thermostatic leaves being engageable with said yieldable connecting means.

5. A control for a furnace having a burner and an electric motor-driven fan for effecting forced circulation of the medium heated by the burner and comprising a metering valve functioning to regulate the flow of fuel to the burner, room thermostat controlled means cooperating with said metering valve to normally control its position, a switch for regulating the operation of the electric motor-driven fan, a switch operating lever connected to the switch, an adjusting lever on which said switch operating lever is fulcrumed, manually adjustable means for shifting said adjustable lever, and thermostatic means responsive to the temperature of the heat circulating medium in the furnace and cooperable with said switch operating lever to cause it to move the switch to closed position, said switch-operating lever having sufficient movement to first operate said switch and thereafter to effect operation of said metering valve upon continued rise of temperature of the heat circulating medium.

6. A control for a furnace having a burner and an electric motor-driven fan for effecting forced circulation of the medium heated by the burner and comprising a metering valve functioning to regulate the flow of fuel to the burner, room thermostat controlled means cooperating with said metering valve to normally control its position, a switch for regulating the operation for the electric motor-driven fan, a switch operating lever connected to the switch, an adjusting lever on which said switch operating lever is fulcrumed, manually adjustable means for shifting said adjustable lever, thermostatic means responsive to the temperature of the heat circulating medium in the furnace and cooperable with said switch operating lever to cause it to move the switch to closed position upon predetermined rise of temperature of the heat circulating medium, and means operatively inter-relating said switch operating lever and said room thermostat controlled means whereby upon continued rise of temperature of the heat circulating medium in the furnace above that required to set the fan in operation the thermostatic means will function to move the metering valve toward closed position independently of the requirements of said room thermostat controlled means.

7. A control for a furnace having a burner, power means for circulating the heat transfer medium, and means for producing a forced draft for the burner, said control comprising a metering valve for regulating the flow of fuel to the burner, electro-responsive motor means for operating said valve operable under control of a room thermostat, a switch for controlling the operation of said power means, thermo-responsive means subject to the heat of said transfer medium for operating said switch, lost motion connection means between said thermo-responsive means and said electro-responsive motor means whereby said thermo-responsive means causes said valve to be closed after operating said switch upon a continued rise in the temperature of said medium, and a second switch for said draft-producing means, said second switch being operated by said electro-responsive motor means after it opens said metering valve.

8. A control for a furnace having a burner, power means for circulating the heat transfer medium, and means for producing a forced draft for the burner, said control comprising a metering valve for regulating the flow of fuel to the burner, electro-responsive motor means for operating said valve operable under control of a room thermostat, a switch for controlling the operation of said power means, thermo-responsive means subject to the heat of said transfer medium for operating said switch, lost motion connection means between said thermo-responsive means and said electro-responsive motor means whereby said thermo-responsive means causes said valve to be closed after operating said switch upon a continued rise in the temperature of said medium, a second switch for said draft-producing means, said second switch being operated by said electro-responsive motor means after it opens said metering valve, and a third switch for rendering said electro-responsive motor means inoperative to open said valve, said third switch being operated by failure in said thermo-responsive means.

9. A control for a furnace having a burner and comprising a single metering valve biased to open position and regulating the flow of fuel to the burner, a valve-operating lever overlying the valve engageable therewith to move the valve toward closed position when swung in one direction and to allow the valve to open when swung in an opposite direction, two thermostatic leaves, an electric heating element associated with each thermostatic leaf, a room thermostat for selectively energizing said electric elements, a yieldable abutment carried by said lever, one of said leaves when de-energized being engageable with said abutment to move said lever a predetermined distance to partially open said valve, and a stop to limit the movement of said leaf, the other of said leaves when energized being thereafter engageable with said abutment to move said lever a further distance to completely open said valve.

10. A control for oil burners comprising a metering valve biased to open position and regulating the flow of oil to the burner, a high fire stop cooperable with the valve to limit the opening movement thereof, an operating lever overlying and engageable with the valve to move the valve toward closed position when swung in one direction and to allow the valve to open when swung in the other direction, a low fire stop underlying the lever and limiting the extent to which the lever may swing to close the valve, thermostatically controlled means cooperable with the lever to move the same to a position wherein the valve is disposed intermediate high and low fire positions, and thermostatically controlled means also cooperable with the lever for moving it to a position where the valve is fully open.

ROY W. JOHNSON.
LOURDES V. McCARTY.